Patented Aug. 23, 1938

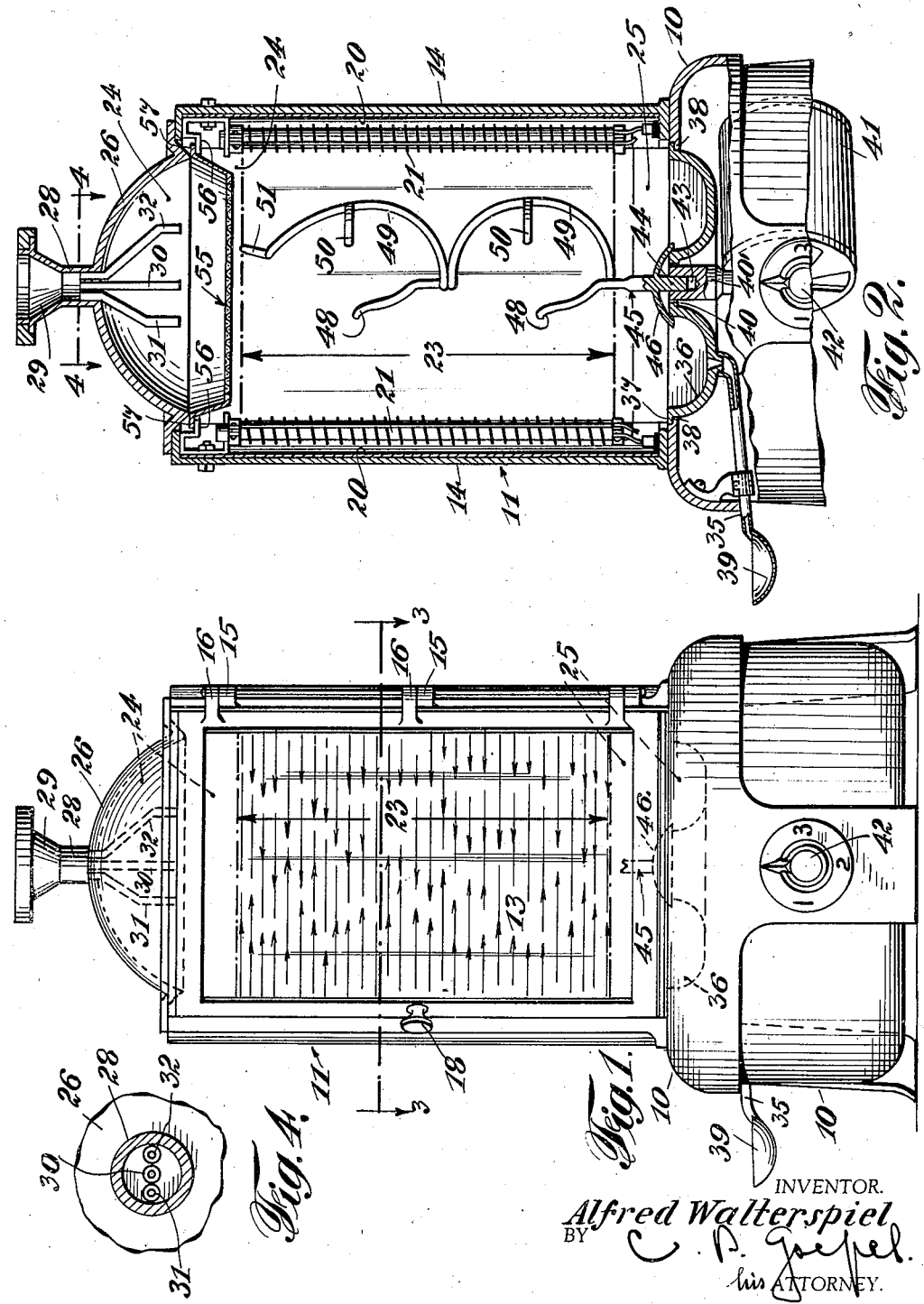

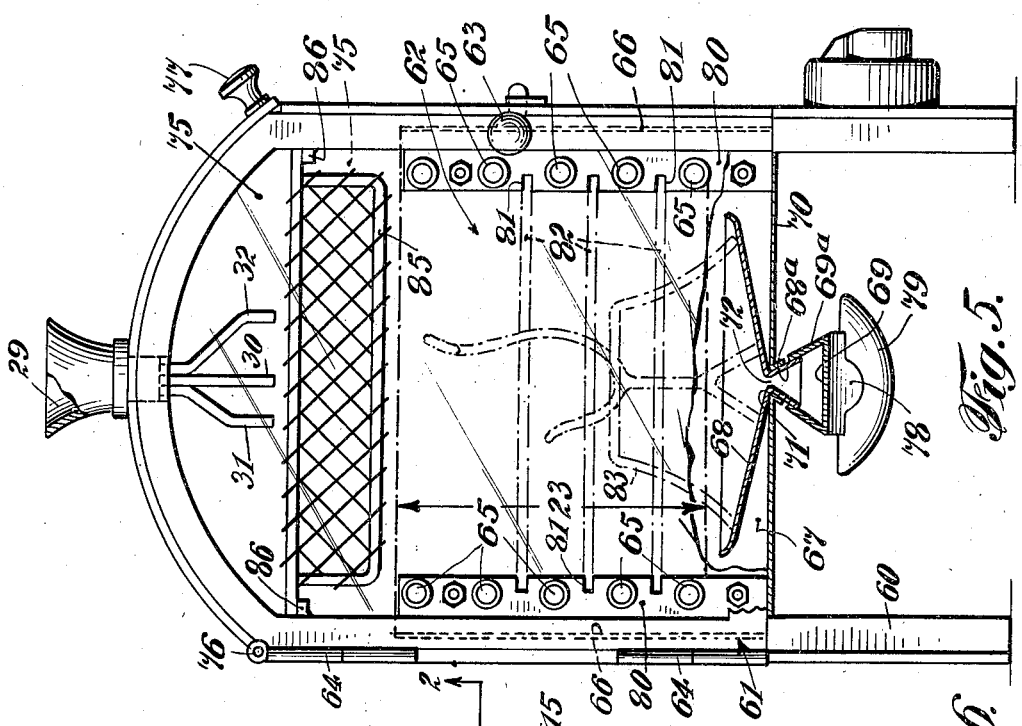
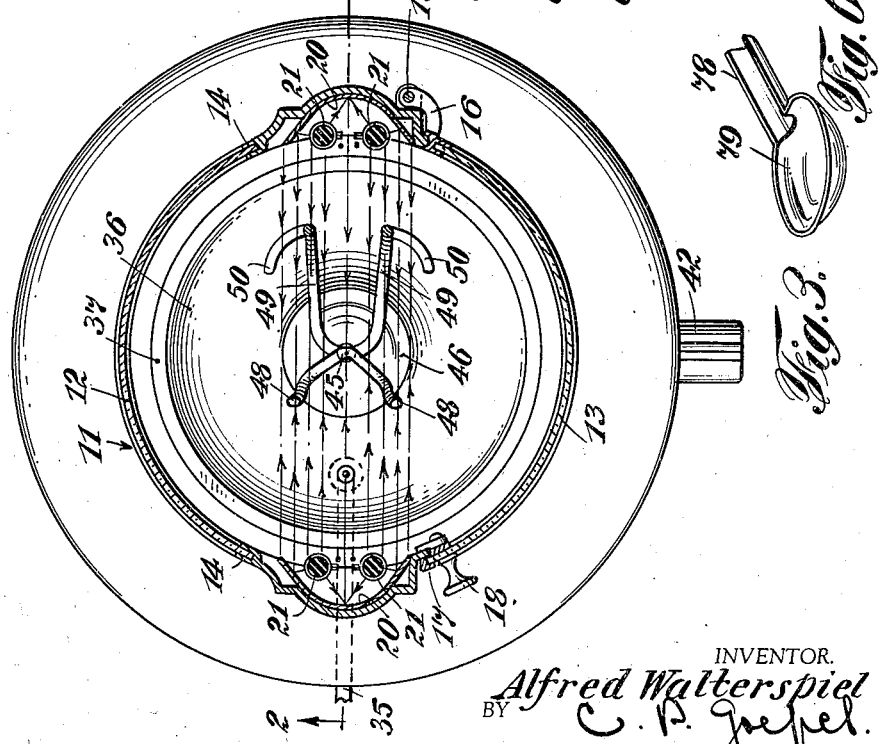

2,127,658

UNITED STATES PATENT OFFICE 2,127,658

ELECTRIC CULINARY OVEN

Alfred Walterspiel, Munich, Germany

Application July 19, 1935, Serial No. 32,151

7 Claims. (Cl. 219—35)

This invention relates to improvements in electric culinary ovens. More particularly, the improvements forming the basis of this application are directed to the structure shown in my copending applications Serial Nos. 605,718 and 748,249. I have also filed an application for a method under Serial No. 702,421, filed on Dec. 14, 1933.

The improvements forming the basis of this application consist in providing the cover with small diametered conduits which serve as substantially the sole air communicating means between the interior of the oven and the air exterior to the casing thereof; also, the improvements consist in the provision of the drip receiving member being exterior to the effective heat zone and in contact with the exterior air, in connection with which the sole means of air communication between the interior of the oven and the exterior air is arranged, said communicating means being of restricted form.

In the inventions described in this application, the oven is divided into substantially three different parts, an upper air zone, an effective heat zone, and a lower air zone; and the means for communicating with the air exterior to the oven casing is arranged in the upper air zone and in the lower air zone. The heat effective zone is produced by having diametrically opposite electric heating means vertically arranged along the sides of the casing at the interior thereof, and these heating means are so disposed as to create an effective zone which causes the heat waves therebetween to be arranged substantially horizontally and parallel with each other, forming within the effective heat zone a series of heat strata.

The article to be heated is disposed between these oppositely disposed heating means and within this heat stratification and there is no circulation, as this word is generally understood, of the exterior air through the interior oven and out of the same. Whatever air enters the lower air zone through this restricted air communicating means, diffuses, in contrast to circulation, into the air zone forming the effective heat zone and whatever air leaves the effective heat zone at the upper part thereof diffuses, in contrast to circulation, into the upper air zone.

In roasting, as opposed to baking, the meat or other food is exposed to thermal radiation (infra-red electromagnetic radiation). In the early ovens, glowing charcoal or coal furnished a source of radiation. In more recent times, units heated to incandescence by gas flames were used. The use of burning coal or gas necessitated an adequate air supply—consequently the ovens were built with large flues in the tops and openings in the sides and bottoms. Often one entire side was left open. As a result, large masses of air continually moved into the oven, expanded under the influence of the heat, and proceeded up the chimney. This large current of air carried a major portion of the heat up the chimney, cooled and dried the surface of the meat. Ovens were, accordingly, very inefficient in the use of thermal energy. Constant basting of the meat was necessary to prevent its drying out. But there were certain advantages: The rapidly rising current of air carried off all excess moisture and all odors. The ingress of a large amount of cool air at the bottom kept the drippings at a comparatively low temperature; the drippings were not dried up or burned, and unpleasant odors resulting from burning drippings were prevented. As a rule, these ovens provided satisfactory roasts for general uses, but the ovens were large and not generally portable; they required flue connections to the chimney; they were wasteful of fuel, and an attendant was necessary to baste the meat almost continually.

Modern requirements of small size, portability, etc., suggested the use of electric heating units, and the cost of electric power necessitated much more efficient design, and greatly reduced size. The attempts to meet the requirements were generally not successful. The very small size, low power consumption, and attendant features of the ovens give great importance to features of design and construction that could be ignored in the larger coal and gas ovens. "General principles" vaguely stated are of little use; it is essential to consider in detail many factors that might at first glance appear to be minor details of construction.

For convenience, electric roasting ovens are here divided into several classes, and the principles of each type analyzed to show reasons for the lack of complete success.

*Type 1.*—Electric ovens in which large openings are provided at top and bottom for the free passage of air currents. These ovens possess all the virtues and all the defects of the earlier gas or coal ovens, and the higher cost of electric power make their continual use prohibitively expensive.

*Type 2.*—Ovens completely closed. From the point of view of consumption of electricity only, this type is very efficient. But there are many serious and obvious defects. Some of the moisture present in the meat is vaporized, the vapor cannot escape, and the meat is steamed as well as roasted. It is impossible to baste the meat except by the use of an automatic pump, or similar device. This feature adds to the cost of production and operation, makes operation complicated, and makes the oven hard to keep clean. The only other alternative is to open the oven frequently—this procedure eliminates all the good features claimed for this type. In addition, no provision is made for keeping drippings below the vaporizing point, and unpleasant odors result. As the oven is closed, the odors cannot escape, and so permeate and flavor the meat.

A serious difficulty in many of the devices heretofore proposed is apparent in that the drip pan can become so hot that at least part of the drippings are vaporized or burned as soon as they drop, and before they can flow out. Convection currents seem to be the greatest factor in heating the drip pan. Air heated by the electrical coils rises to the top, and it cools slightly by contact with the top, drops along the wall to the bottom, and is still hot enough to raise the temperature of the drip pan to an undesirable extent.

The oven embodying the invention of this application eliminates this circulation very effectively. The case of the oven is either an upright cylinder with a domed top, or a rectangle with a top curved upward. The case is made either of glass or of polished metal, or a combination of both. A drip pan is set into the base, and the pan contains a small opening to permit the escape of drippings. A metal tube of small diameter projects vertically downward from the highest portion of the top. Thus, the openings come about two or so inches below the highest point. This feature appears to be of importance in the action of the oven. Heating units are arranged in two banks on opposite sides of the oven, extending from a few inches above the drip pan to below the beginning of the curve of the top. The units are backed by metal reflectors of either parabolic or plane cross section. The units are either open coils or coils enclosed in dull black casings. A dull black surface is an excellent radiator, a polished surface a remarkably poor radiator.

The ovens embodying the invention of this application are simple in operation, small, compact, efficient, and do not heat the room to a noticeable extent, even on a summer day. Meat, fish, and fowl are excellently roasted, with a minimum of attention, no odors are produced, and the drippings do not smoke or burn in the drip pan. The drip pan is at a considerably lower temperature than the roast, or the walls of the oven. The drip pan could be heated by convection, radiation, or conduction from the walls of the oven. But of these three possible ways, convection appears to be the most important. Tests have been made to determine the precise state of the air inside the oven. The oven was heated as in actual cooking, and a dense smoke introduced through the small opening in the drip pan. The smoke gradually dispersed through the oven showing no definite currents in the process except those produced by blowing the smoke in. Upon heating the oppositely disposed electrical heating means to set in operation the effective heating zone, the smoke finally settled in strata between the oppositely disposed heating means. No currents of appreciable magnitude were apparent.

The reasons for this lack of well developed convection currents are apparent. A convection current would be formed in the following way: Air around the coils is heated, expands, rises to the top, and its place is taken by air from the bottom. Coming in contact with the top, the air is cooled to some extent, contracts, and sinks. To form the current, it is essential that air, after rising past the heating units, be cooled sufficiently to make it drop toward the bottom. The formation of the current is materially aided if some of the heated air can escape at the highest level, and if the same amount of cold air can be drawn in near the bottom of the heating units. When the outside of the top is of polished metal (a very poor radiator), the escape of heat is prevented. When the oven is first started, currents rise from both banks of units, and meet in the middle of the top. As the small openings are some distance below the highest point, this air does not escape. Consequently, after the oven reaches the ordinary operating temperature, a cushion of hot air is formed under the curve of the top, and this forms a good insulator, so that the air below it is not cooled sufficiently to start a current. It is most important to have heating units on both sides of the oven, if convection currents are to be prevented. If the units are on one side only, the other side is at a lower temperature, and a current of large proportions is produced. So, it is clear that the embodiments of this invention effectively prevent convection currents of any magnitude.

The drip pan is not appreciably heated by radiation for the following reasons:

1. The pan is several inches below the bottoms of the coils, and so is not exposed to direct radiation.

2. Little reflected radiation reaches the pan. The top is either approximately spherical or curved, hence, radiation reflected from the top is brought to a focus above the drip pan substantially in the place occupied by the meat, and is absorbed by the meat. (Thermal radiation follows the ordinary laws of reflection for visible light). The roast also serves as a shield to screen the drip pan from most of the downward reflection from the side walls.

The pan is not heated by conduction from the walls, for the pan is some distance below the heating units, and the pan is made of metal (bare or enameled)—an excellent conductor—and so heat is conducted away to the base. As the base is quite massive, it can absorb and dissipate relatively large amounts of heat, and the pan is maintained at a considerably lower temperature than the roast, or the sides of the oven.

The oven is, therefore, very efficient. The openings are just large enough to carry off excess moisture, but not large enough to allow an appreciable quantity of heat to escape, or enter. This is possible because there are no unpleasant odors from the drip pan to be disposed of. There are no odors because the pan is at a low enough temperature so that drippings do not smoke or burn before they flow out of the pan. The pan is kept at a low temperature by the following special features:

1. Pan is at some distance below heating units.

2. Convection currents are eliminated or reduced to negligible magnitude by the two banks of heating units on opposite sides of the oven, by the shape and material of the top, by the location of the small openings below the highest point in the top, and by the small size of the openings.

3. The pan is shielded from radiation by the spherical or cylindrical shape of the top which brings reflected radiation to a focus in the roast.

4. Heat reaching the pan by conduction is conducted away rapidly to the fairly massive base.

These features are not accidental or minor features of design or construction. Taken together they form the reason for the excellent results and high efficiency of the oven, separately they would produce little or no effect.

The improvements forming the basis of this application are directed to structures of the kind just described and the top cover is provided with one conduit or a plurality of conduits having a small diameter or diameters which permit the passage therethrough of any juices to be applied to the exterior of the article to be heated, while it is being heated, and at the same time permit a restricted communication with the exterior air. The improvements also consist in having the means for receiving the drippings arranged out of the effective heat zone and in restricted air communication with the exterior air and in contact with the exterior air so as to cool them, the drip receiving means however being within the casing of the oven. These ovens are substantially hermetically sealed for all practical purposes and the communication with the air exterior of the oven is brought about essentially through these restricted air communicating means. Whatever cracks or slight openings may be present as the result of commercial manufacture, do not influence the diffusion action taking place in the interior of the oven.

The invention will be further described hereinafter as shown in the drawings and finally pointed out in the claims.

In the accompanying drawings—

Figure 1 is a side view of one embodiment of my invention showing a cylindrical upright oven;

Figure 2 is a central section thereof taken on the line 2—2 of Fig. 3;

Figure 3 is a horizontal section taken on the line 3—3 of Fig. 1;

Figure 4 is a section taken on the line 4—4 of Fig. 2;

Figure 5 shows an end view of another embodiment of an oven of horizontal form embodying my invention; and Figure 6 is a perspective view of a pan arranged at the end of the drip receiving conduit.

Similar characters of reference indicate corresponding parts throughout the various views.

Referring to the drawings and more particularly to Figures 1 and 2, the improved electric culinary oven is provided with a standard or base member 10, upon which rests a cylindrical casing member generally referred to as 11. This casing preferably consists of two oppositely disposed curved glass walls 12 and 13 which enable the cooking operation to be visible from the exterior of the oven. One of these walls 12 is suitably held by the metallic portions 14 and at the other ends of these metallic portions 14 there is provided a hinge member 15 cooperating with a hinge 16 of the front door 13, the free end of which has a locking device 17 and handle 18. Within each metallic member 14, a deflector 20 is arranged which in the embodiment is placed directly against the inner wall of the members 14 in a very snug manner, and is either fastened thereto by small screws or otherwise secured in position, and preferably is substantially parabolic in shape. Within the curvature of these deflectors 20, vertically disposed electric heating means 21 are arranged and in the embodiment shown in Fig. 3 there are two of these vertically arranged and parallel with each other at each side of the casing, each pair being within one deflector, 20. These electric heating means 21 extend from near the lower portion of the casing 11 to near the upper part thereof, but preferably not to the extreme ends of the casing, so as to allow a certain air zone both above and below the effective heat zone indicated by 23. The upper air zone is generally indicated by 24, and the lower air zone is generally indicated by 25. Superimposed upon the casing 11 is a removable top 26, which in the embodiment shown is curved so as to form an extended air zone and the air within this curved portion or top 26 cooperates with the air which has just been referred to as generally indicated by 24. The curved shape of the top serves to deflect the heat rays to a local point within the casing.

The central upper portion of the curved top 26 is provided with a cylindrical member 28 having outwardly diverging walls 29 in the nature of a funnel. Within the cylindrical portion 28 is a member having three openings and within each opening is arranged a pipe or conduit having a small diameter. Only one of these pipes may be used. One of these conduits, the one indicated by 30, extends downwardly substantially along the axis of the oven and each of the other two, 31 and 32 has a bent or curved portion so as to direct any fluid laterally of the axis of the oven. The free ends of these conduits 30, 31 and 32 are disposed above a plane passing through the lower edge of the top 26, this plane being generally indicated by line 34, so that the cover can be placed upon a table in a convenient manner and the conduits 30, 31 and 32 not broken off or bent during the placing of the top upon a flat surface.

In the embodiment shown, the curvature of the top 26 and the length of the conduits 30, 31 and 32 are so arranged that the air communication resulting from the passage of air through the interior of the conduits from the exterior of the oven to the interior, or from the interior of the oven to the exterior thereof, takes place in that part of the air zone where these small diametered conduits terminate. It is probably the fact that a certain amount of steamed air which results from the operation of the oven accumulates in the interior of the curved portion 26, and it is advisable to hold such air within the oven but any excess of the layers which would form themselves within the curved portion 26 when such layers come down to the free ends of the conduits 30, 31 and 32 is then in a position to communicate with the exterior of the oven. Generally speaking, there is no circulation of air through these conduits, which statement is based upon the fact that when an oven of this type is in operation and a burning match is placed in the funnel shaped portion 29, the flame of the match takes its normal contour insofar as the naked eye can detect. It may be possible that testing instruments would determine an inflow or outflow of air and it may also be that only certain parts of the air, as for instance, the moisture content of the air, enters or exits through these conduits. The same applies to the conduits 35 now to be described.

In the lower portion of the casing 11, there is arranged a drip receiving member 36 which as shown in the embodiment is readily removed from the casing, in that it has a flange 37 cooperating with the shoulder portion 38. This drip receiving portion 36 is preferably made of iron or steel with a lining of porcelain or other white enameled material so it can be readily cleaned. To the lowermost portion of the drip receiving member 36 there is arranged an outlet conduit 35 having a very small bore and this extends outwardly of the casing. The end of the conduit 35 is preferably provided with a bowl shaped portion 79 to collect the drippings, and below the end of the conduit 35, a pan or the like may be placed to receive the outflowing accumulated drippings, if the bowl shaped portion is not used. It will be noted that the drip receiving portion 36 is a circumferentially disposed pan of the contour shown in Fig. 2, and that the exterior of the same is in contact with the air exterior to the oven which enables it to remain relatively cool. This feature is augmented by having the air communicating means or having the conduit 35 at the lowermost portion of the drip receiving member 36 as shown in Fig. 2.

The drip receiving member 36 has a central opening 39 and within this opening is placed a rotatable member 40 suitably connected by gearing or the like to an electric motor 41, the speed of which is determined by the switch member 42, which switch member also is used to put into operation the electrical heating means 21. The central member 40 has a recess 43 into which a stem 44 of an article supporting member generally indicated by 45 is placed. This member 45 has a shield portion 46 extending over the central opening 40 of the member 36 and is so shaped as to deflect any drippings as may fall upon the shield 46 into the drip receiving member 36.

The article supporting member 45 shown in Figs. 2 and 3 consists of two substantially symmetrical parts each of which is specially adapted to hold a fowl without piercing the same. This article supporting member 45 consists of two arms 48 and rounded body members 49, each having a lateral arm 50. The uppermost portion of this article supporting member has a small handle 51. By the symmetrically arranged article supporting member, two fowls may be roasted at the same time, one above the other. It is clear that either one fowl alone may be used, or a similarly shaped single article supporting member may be placed in position and disposed over the drip receiving portion 36 and within the effective heat zone. It will be noted that the lowermost portion of the article supporting member preferably does not extend below the effective heat zone 23, and similarly to uppermost portion of the article to be heated does not extend beyond the effective heat zone 23, as shown in Fig. 2 of the drawings.

The operation of the embodiments shown in Figs. 1 to 4 is as follows:

The interior of the oven shown in Fig. 1 is first heated for a few moments, during which time the article supporting member 45 is exterior to the oven and the fowl or other article to be heated is suitably placed therein. Then the door by means of its handle 18 is opened, swinging on its hinge members 15 and 16, and the article supporting member is placed in position upon the central member 40 and rotated therewith. The article holding member is disposed above the drip receiving member 36 and the roasting operation then takes place by the effective heat zone acting in substantially parallel strata upon the article to be roasted under the action of heat waves and infra-red electromagnetic radiation. Any drippings falling out of the effective heat zone into the cooler layer air zone and that part of the zone which is within the circumferentially disposed drip receiving member 36, when sufficiently accumulated, form a stream and flow out of the conduit 35. These drippings may then be placed in the funnel shaped portion 29, and thereby they drop by gravity either over the central portion of the article to be heated or over the lateral portions thereof during the rotation of the article to be heated within the effective heat zone or over both. When there is no flow of drippings through the conduit 35 or through the conduits 30, 31 and 32, these conduits permit communication with the air exterior to the oven as described, under the action of the diffusion. When the roasting operation has been completed, the electrical current is turned off, and the article which has been roasted may then be removed by the opening of the door 18, which door has remained closed during the roasting operation. The transparent walls 12 and 13 permit the roasting operation to be seen from the exterior of the oven.

In some embodiments it may be desirable to provide an article holding member generally indicated in Fig. 2 by 55 and when this is desired, it is placed upon guideways 56 at the interior of the oven, the flanges 57 of the support 55 slidably resting upon said guideways. When such an additional article supporting member is used, it is preferable to provide it with a perforated bottom or have it made of reticulated metal fabric material so as to permit the passage of the heated air therethrough.

The invention which has been described is also applicable to horizontally arranged culinary ovens and an embodiment thereof is shown in Fig. 5 of the drawings. Here, the standards 60 support a casing 61 having a glass front door 62 provided with a handle 63 and hinges 64. The electrical heating means 65 are arranged close to the lateral walls of the casing 61 and these walls are preferably provided with a deflector 66 so as to deflect the heat waves from the wall of the casing to the diametrically opposite electric heating means 65. The electric heating means consist of horizontally arranged coils or tubes and these coils or tubes are superimposed over each other in spaced relationship so as to form a vertical disposition of the electric heating means. These electric heating means 65 again form an effective heating zone with horizontal strata diffusing into an air zone 67 below the effective heat zone 23, and below this effective heat zone is a drip receiving member 68 having a portion 69 acting as a conduit extending outwardly of the base 70 of the casing. The base 70 of the oven is provided with a narrow slot 71 which permits the horizontal movement therethrough of the narrowest portion of the drip receiving member 68 and the walls of this drip receiving member 68 come very close to each other so as to provide a very narrow opening 72 extending along the bottom of the casing 61 along the length thereof, which forms the means of air communication between the interior and exterior of the casing at the lower part of the oven.

There is also provided an upper heat zone 75 above the heat effective zone 23. The upper dome shaped cover member which is suitably hinged at 76 and which may be opened by means of the handle 77 is also provided with the funnel shaped portion 29 and the drip conduits 30, 31 and 32 in substantially the same manner as shown in Fig. 2, or it can have the conduits arranged in a suitable manner adapted to this form of oven.

At the end of the drip conduit 69 and exterior to the casing, a lip portion as shown in Fig. 6 is provided which lip portion 78 terminates in a pan 79 wherein the drippings accumulate, and these can be taken out by means of a spoon and poured into the funnel 29 when desired.

The vertically disposed horizontal members 65 which serve to produce the electrical heating means, are supported at each end thereof by vertical members 80, which in one embodiment, may be provided with slots 81 into which the flanges of pans or grids may be inserted, whereby the vertical members 80 with their recesses 81 oppositely disposed in symmetrical relationship to each other may serve to support various article supporting devices as for instance the pans shown in dotted lines and indicated by 82, or part of these may be used. An article supporting member 83 directly supported upon the drip receiving member 68 may be used. Another article supporting member 85 may be slidably supported on the flanges 86 in the upper part of the oven. It is preferably of reticulated form, or a fowl holding holder similar to that of Fig. 2 may be used.

The embodiment shown in Fig. 5 has front and rear walls provided with glass so that the contents of the oven may be visible and this is a preferred form, although the invention is not limited thereto. A lamp may be arranged within the oven near the top thereof to aid the visibility of the interior. The embodiment shown in Fig. 5 can be of any length, either short or long, the preferred form having a general rectangular cross section. The operation described in connection with Figs. 1, 2 and 3 applies equally well to the embodiment shown in Fig. 5.

From the foregoing, it will be particularly noted that the electric culinary ovens embody the invention of having an effective roasting zone produced by oppositely disposed electrical heating means, whereby the heat waves form stratifications therebetween and wherein there is a coaction of the respective infra-red electro-magnetic radiations. Air, in any upper or lower zones cooperates with that effective zone by diffusion. Air or constituents thereof, enter or leave, by diffusion, in contrast to circulation. The invention consists of other features as hereinbefore set forth.

By heat effective zone is understood to mean that portion of the air within the casing disposed between the two electrical heat producing means. The heat waves or radiations, the infra-red electromagnetic waves, the electric effects, the magnetic effects, etc., all cooperate. Furthermore, the reflection of the same by the deflector causes an influencing of these effects upon each other. Commercial manufacture of the heating coils or the like do not produce identical products and the electrical currents acting upon different products, has also an effect. The fact that two parallel members are present in a certain condition of the air produce special effects, perhaps the "Edison effect" will serve as an analogy. Whatever the scientific theory may be, the disposition of susbtantially like electrical heating members oppositely disposed, and in susbtantial parallelism with each other, produces effects therebetween which are utilized in the roasting of the article, and which effects are generally referred to in this case as the effective heat zone.

To facilitate cleaning the drip receiving member of the embodiment shown in Figure 5, it is preferably made in two parts. The upper part 68 has divergent flanges 68ª, so as to hold the drip receiving member 68 in position. The collector portion 69 has convergent walls 69ª overlapping the divergent walls 68ª. Thereby by a sliding action the collector 69 can be taken apart and readily cleaned.

The fowl holding support shown in Fig. 2 as adapted to hold two fowls, and in Fig. 5 as holding one fowl, can of course be so arranged as to hold a plurality of fowls, either arranged vertically or horizontally within the effective heat zone.

My invention has been illustrated and described with some degree of particularity, but it is understood that changes may be made in the form of details and in the construction and arrangement of parts without departing from the spirit and scope of the invention or the scope of the appended claims.

I claim:

1. An electric culinary oven, comprising a substantially closed casing having a closed top and a closed bottom and drip restricted openings limited by the passage of drippings through said top, and drip discharging restricted openings limited by the passage of drippings through said bottom, said drip receiving and discharging openings communicating with the atmosphere exterior to the casing, means in said casing for supporting the article of food to be heated, the height and width of the casing approximating the average size of articles of food to be heated, and electrical heating means disposed at two substantially diametrically opposite sides of said casing and of said article of food and spaced therefrom and extending above and below said article of food for producing an effective heat zone having its radiations or the like pass from one means to the other and through said article of food in strata like effect, substantially uninfluenced by any currents of air disturbing the stratification, and without circulation of air from the restricted openings.

2. An electric culinary oven, comprising a substantially closed casing having a closed top and a closed bottom and drip restricted openings limited by the passage of drippings through said top, and drip discharging restricted openings limited by the passage of drippings through said bottom, said drip receiving and discharging openings communicating with the atmosphere exterior to the casing, means in said casing for supporting the article of food to be heated, the height and width of the casing approximating the average size of articles of food to be heated, electrical heating means disposed at two substantially diametrically opposite sides of said casing and of said article of food and spaced therefrom and extending above and below said article of food for producing an effective heat zone having its radiations or the like pass from one means to the other and through said article of food in strata like effect, substantially uninfluenced by any currents of air disturbing the stratification of the heat zone, and means disposed adjacent the electric heating means at the side thereof distant from the article of food for deflecting the radiation or the like energy from one electric heating means to the other.

3. An electric culinary oven, comprising a substantially closed casing having a closed top and a closed bottom and drip restricted openings limited by the passage of drippings through said top, and drip discharging restricted openings limited by the passage of drippings through said bottom, said drip receiving and discharging openings communicating with the atmosphere exterior to the casing, means in said casing for supporting the article of food to be heated, the height and width of the casing approximating the average size of articles of food to be heated, electrical heating means disposed at two substantially diametrically opposite sides of said casing and of said article of food and spaced therefrom and extending above and below said article of food for producing an effective heat zone having its radiations or the like pass from one means to the other and through said article of food in strata like effect, substantially uninfluenced by any currents of air disturbing the stratification of the heat zone, means disposed beyond the electric heating means for deflecting the radiation or the like energy from one electric heating means to the other, and a drip receiving member within the casing and below the supporting means consisting of a pan substantially equal in area to the bottom of the casing and having a discharge opening in communication with the restricted drip opening in communication with the atmosphere exterior to the casing.

4. An electric culinary oven, comprising a substantially closed casing having a closed top and a closed bottom and drip restricted openings limited by the passage of drippings through said top, and drip discharging restricted openings limited by the passage of drippings through said bottom, said drip receiving and discharging openings communicating with the atmosphere exterior to the casing, means in said casing for supporting the article of food to be heated, the height and width of the casing approximating the average size of articles of food to be heated, electrical heating means disposed at two substantially diametrically opposite sides of said casing and of said article of food and spaced therefrom and extending above and below said article of food or producing an effective heat zone having its radiations or the like pass from one means to the other and through said article of food in strata like effect, substantially uninfluenced by any currents of air disturbing the stratification of the heat zone, means disposed beyond the electric heating means and in proximity thereto for deflecting the radiation or the like energy from one electric heating means to the other, and a detachable drip receiving member within the casing and below the supporting means consisting of a pan substantially equal in area to the bottom of the casing and having a discharge opening in communication with the restricted drip opening in communication with the atmosphere exterior to the casing, and an extension on said pan exterior to the casing adapted to act as a conduit for the drippings, said drip receiving member having a constricted portion to enable the drip receiving member to pass into and out of the restricted opening in the bottom of the casing when being detached from the casing, without materially increasing the restricted air opening in the lower part of the casing.

5. An electric culinary oven, comprising a substantially closed casing having a closed top and a closed bottom and drip restricted openings limited by the passage of drippings through said top, and drip discharging restricted openings limited by the passage of drippings through said bottom, said drip receiving and discharging openings communicating with the atmosphere exterior to the casing, means in said casing for supporting the article of food to be heated, the height and width of the casing approximating the average size of articles of food to be heated, electrical heating means disposed at two substantially diametrically opposite sides of said casing and of said article of food and spaced therefrom and extending above and below said article of food for producing an effective heat zone having its radiations or the like pass from one means to the other and through said article of food in strata like effect, substantially uninfluenced by any currents of air disturbing the stratification of the heat zone, means disposed beyond the electric heating means and in proximity thereto for deflecting the radiation or the like energy from one electric heating means to the other, and a drip supplying member in the upper part of the casing above the supporting means, said drip supplying member not increasing the air communication with the exterior atmosphere.

6. An electric culinary oven, comprising a substantially closed casing having a closed top and a closed bottom and drip restricted openings limited by the passage of drippings through said top, and drip discharging restricted openings limited by the passage of drippings through said bottom, said drip receiving and discharging openings communicating with the atmosphere exterior to the casing, means in said casing for supporting the article of food to be heated, the height and width of the casing approximating the average size of articles of food to be heated, electrical heating means disposed at two substantially diametrically opposite sides of said casing and of said article of food and spaced therefrom and extending above and below said article of food for producing an effective heat zone having its radiations or the like pass from one means to the other and through said article of food in strata like effect, substantially uninfluenced by any currents of air disturbing the stratification of the heat zone, means disposed beyond the electric heating means and in proximity thereto for deflecting the radiation or the like energy from one electric heating means to the other, a latent air zone above the effective heat zone and below the restricted air openings of the top of the casing, and a latent air zone below the effective heat zone, and above the restricted air openings of the bottom of the casing.

7. An electric culinary oven, comprising a substantially closed casing having a closed top and a closed bottom and drip restricted openings limited by the passage of drippings through said top, and drip discharging restricted openings limited by the passage of drippings through said bottom, said drip receiving and discharging openings communicating with the atmosphere exterior to the casing, means in said casing for supporting the article of food to be heated, the height and width of the casing approximating the average size of articles of food to be heated, electrical heating means disposed at two substantially diametrically opposite sides of said casing and of said article of food and spaced therefrom and extending above and below said article of food for producing an effective heat zone having its radiations or the like pass from one means to the other and through said article of food in strata like effect, substantially uninfluenced by any currents of air disturbing the stratification of the heat zone, means disposed beyond the electric heating means and in proximity thereto for deflecting the radiation or the like energy from one electric heating means to the other, a latent air zone above the effective heat zone and below the restricted air openings of the top of the casing, a latent air zone below the effective heat zone, and above the restricted air openings of the bottom of the casing, and article of food supporting means, above said effective heat zone.

ALFRED WALTERSPIEL.